United States Patent [19]

Shaw

[11] 4,430,858
[45] Feb. 14, 1984

[54] ELECTRICAL GENERATING SYSTEM

[76] Inventor: Clarence W. Shaw, 3805 Hawkshead Dr., Austin, Tex. 78759

[21] Appl. No.: 407,927

[22] Filed: Aug. 13, 1982

[51] Int. Cl.³ .................................. F16D 31/06
[52] U.S. Cl. ............................ 60/398; 60/325; 417/159
[58] Field of Search .............. 60/496, 326, 649, 673, 60/689, 398, 325; 417/91, 108, 159

[56] References Cited

U.S. PATENT DOCUMENTS

| 366,551 | 7/1887 | Baker | 60/496 |
|---|---|---|---|
| 4,041,710 | 8/1977 | Kraus et al. | 60/689 X |
| 4,083,660 | 4/1978 | Newbrough | 417/108 |
| 4,135,364 | 1/1979 | Busick | 417/108 X |

Primary Examiner—Allen M. Ostrager
Assistant Examiner—Stephen F. Husar
Attorney, Agent, or Firm—Bacon & Thomas

[57] ABSTRACT

An electrical generating system including a tubular chamber for confining an upstanding column of liquid, and a combustion chamber disposed within the tubular chamber wherein products of combustion are directed into the upstanding column of liquid for heating same and dispersing bubbles of the products of combustion therein to reduce the density of the liquid and cause same to rise in the tubular chamber for recirculation from the upper end of the tubular chamber through the lower end thereof for driving a turbine disposed within the stream of recirculating liquid.

10 Claims, 2 Drawing Figures

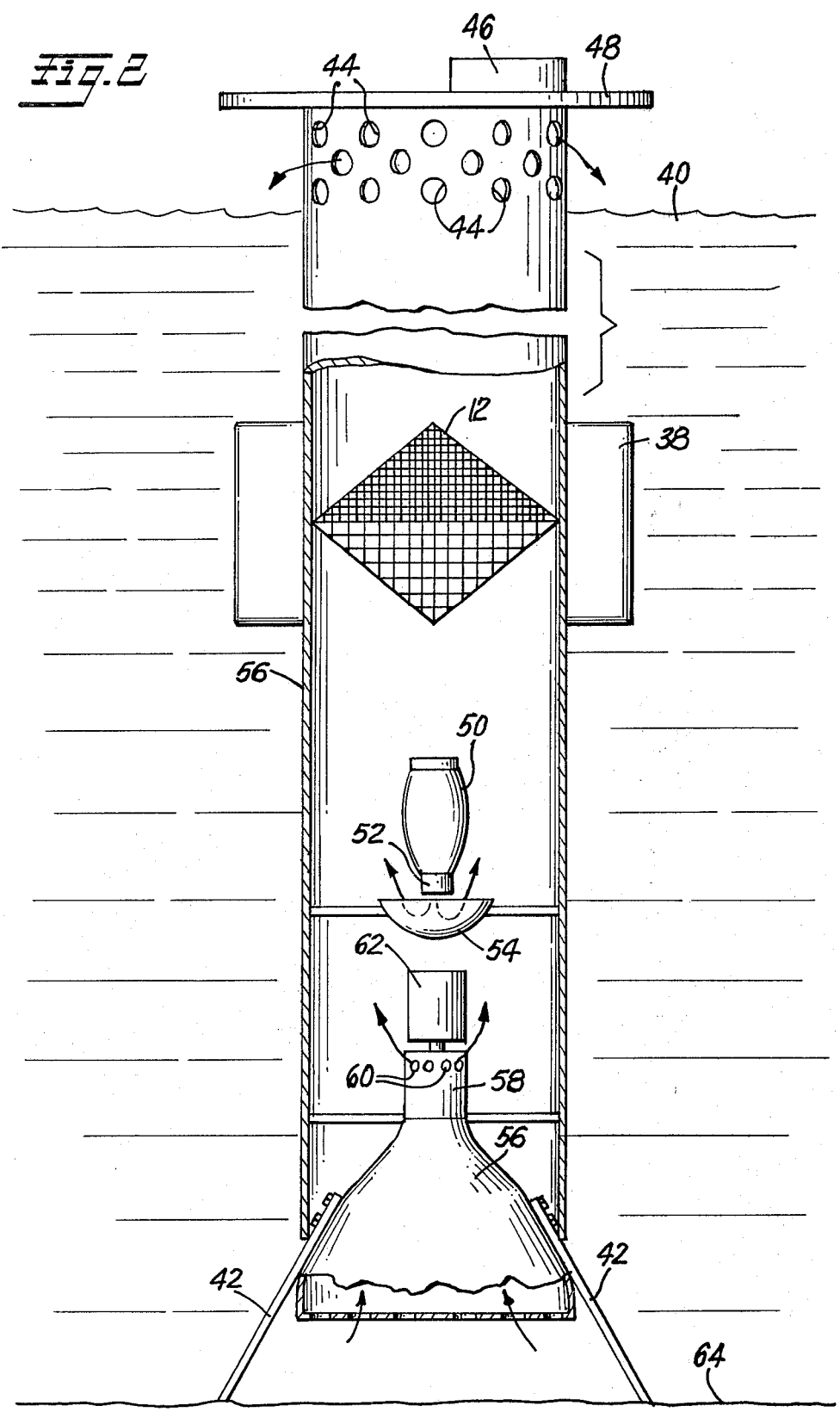

ELECTRICAL GENERATING SYSTEM

BACKGROUND OF THE INVENTION

This invention is in the field of electrical generators driven by fluid turbines.

It has been the practice heretofore to utilize moving fluids to generate electricity by driving turbines but such moving fluids have customarily been gravity impelled fluids such as water falling over a dam or flowing in a river.

SUMMARY OF THE INVENTION

The present invention relates to a system for generating electricity by liquid driven turbines wherein a column of water or the like is confined to extend upwardly a substantial distance and near the bottom of the column a combustion chamber is provided which discharges its products of combustion into the column of water. The products of combustion not only heat the water but disperse bubbles of combustion gases throughout the column of water to reduce the density of the same whereupon it tends to flow upwardly in the column. At the upper end the water spills out of the column into a return path where it is again returned, after being cooled to a greater density, to the lower end of the column to thus create a substantial difference in density between the water inside and that outside the column that further enhances the upward flow of warm water in the column.

In one embodiment the column is in the atmosphere above ground and the return path for water spilled from the column is provided by a surrounding jacket whereas in a second embodiment of the invention the column is in a body of water such as a pond, lake or a body of water in a pit or other opening formed in the ground.

In each case means are provided in the column for dispersing the bubbles of gas throughout the width of the column to prevent their accumulating and consolidating themselves into large bubbles and the dispersion thus provides for ensuring a low density of the rising column throughout its transverse extent. The means generally comprise a screen device in the column through which the water and bubbles must pass, the screen being arranged so that the bubbles pass through a coarse screen first and then through a finer screen, both screens being of such area that they provide greater space therethrough than the area of the column itself.

Further means are contemplated for directing the products of combustion in an upward direction to add kinetic energy to the rising column of water. Somewhere in the stream thus produced a fluid or water driven turbine is placed and arranged to drive a generator for electricity although the turbine can be employed for other power purposes than generating electricity.

In the form of the invention situated in the atmosphere, the electrical generator is outside the means confining the column and return flow whereas in the underwater form of the invention, the generator must be sufficiently waterproof to be operable under water. Obviously, suitable means can be provided for conducting the generated electricity to a usable location.

A further feature of the invention is the provision of means for removing acid from the water since many acids are formed by the products of combustion and which acids dissolve in the water and could thus eventually cause damage to the surrounding environment.

BRIEF DESCRIPTION OF THE DRAWINGS

FIG. 2 is a schematic vertical sectional view through a second embodiment of the invention.

DESCRIPTION OF THE PREFERRED EMBODIMENTS

Figure 1:
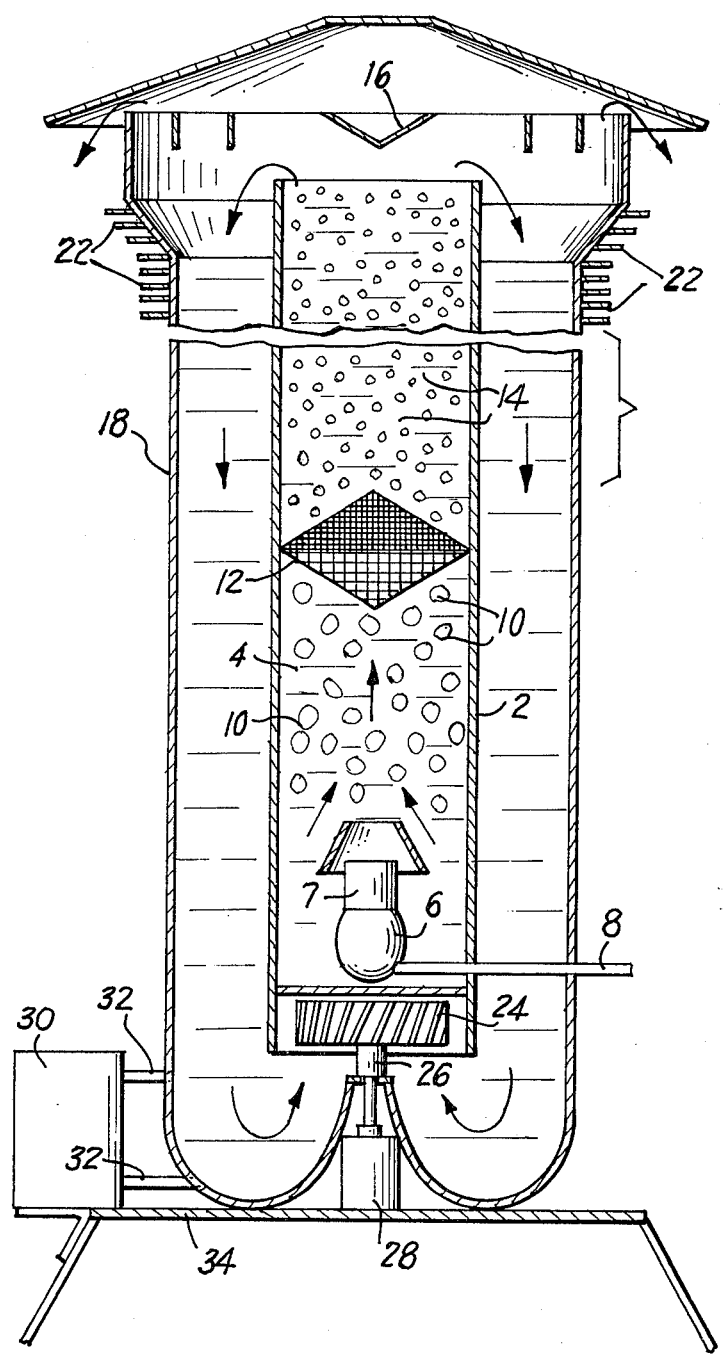
FIG. 1 is a schematic showing, in vertical section, of a first embodiment of the invention.

Referring first to FIG. 1, a tubular member 2 extends upwardly from a lower to an upper end and confines a column of water or other suitable liquid 4. Near the bottom of the column and within the same is a combustion chamber 6 fed with fuel and air through a suitable conduit 8. The products of combustion emitted by the combustion chamber flow upwardly through venturi device 7 and thus draw water into the combustion flame for a quick mix and thus exert a powerful upward thrust on the column of water and form relatively large bubbles 10 in the column of liquid. The gases in the bubbles are quite hot and thus heat the water and reduce its density while at the same time rising upwardly to carry water with them. The bubbles 10 travel through a screen device 12, the lower part of which is fairly coarse screen mesh and the upper part of which is a relatively fine screen mesh which breaks the bubbles 10 up into smaller bubbles 14 dispersed uniformly across the column of liquid. As the bubbles rise and the lighter warm water rises with them, the bubbles are released into the air through a bubble separator 16 and flow outwardly into ambient air whereas the water falls over the upper edge of the tubular member 2 into an annular conduit defined by an outer casing 18 where the water is cooled by virtue of its having lost the bubbles 14, it is also of greater density than the rising column of water in the tubular member 2. To assist in cooling the water in the outer or annular conduit, a series of fins 22 may be provided and the cooler water thus flows as shown by the arrows to the lower portion of the outer annular conduit where it is redirected upwardly and as will be obvious, a continuous flow stream, in closed circuit, flows upwardly through the tubular conduit 2 then downwardly within the annular conduit 18 and through a water driven turbine 24 connected through a sealing gland 26 to an electrical generator 28.

As previously mentioned, an acid separator 30 may be provided and connected to the annular conduit 18 by suitable tubing 32 for circulating at least some of the water in the tubular conduit through the acid-removing device 30 which may be of any suitable type.

The entire structure thus far described may be mounted on a base or platform 34 supported in any suitable manner on the ground.

As will be obvious, the provision of the heat and gases of combustion in the central column causes the same to become much lighter and to rise due to the downward pressure of the cooler and denser water in the outer annular conduit, thus creating a continuous upward flow in the central column and downward flow in the annular conduit to establish a stream for driving the turbine 24 and generator 28.

While not shown, it is contemplated that suitable support facilities will be provided such as a means for supplying fuel and air for combustion within the combustion chamber 6.

Referring now to FIG. 2, the tubular conduit 36 is surrounded by a buoyant blister device 38 to maintain the same upright in a body of water through the upper surface 40 of which the tubular conduit 36 extends. The tubular conduit is supported on the bottom of the body of water by suitable legs 42 or the like, anchored to the bottom, and the blister 38 ensures that the conduit will remain in an upright position extending above the surface 40 of the water. The upper end of the tubular conduit 36 is provided with openings 44 through which water and released gases may emerge into the ambient atmosphere, the water dropping back into the body of water and the gases being released into the atmosphere. Here again, an acid-removing device 46 may be provided on a platform 48 capping the upper end of the tubular conduit 36. The platform 48 may also support other support instrumentalities such as an air compressor, fuel delivery system and the like.

The tubular conduit 36 is also provided with a screen device shown at 12 which may be identical to that described in connection with FIG. 1. A combustion chamber 50 is mounted within and near the bottom of the tubular conduit 36 with its discharge end 52 pointing downwardly into a cup-shaped deflector 54 which serves to deflect the products of combustion to an upward direction to thus add kinetic energy to the rising column of water in the tubular conduit. The screen 12 functions as already described to break up large bubbles of gas. The water having its surface at 40 may enter the lower end of the tubular conduit 36 through an accelerator nozzle 56 and thence into a water-driven turbine 58 having water exhaust ports 60 in its casing from whence the water enters the column in the conduit 36. The turbine 58 drives a generator 62, the output of which may be directed to the surface or onto platform 48 in any suitable manner. It will be apparent that water from the bottom 64 may enter the accelerator 56 and rise in the column within conduit 36 in the same manner as described with reference to FIG. 1.

The legs 42 are preferably anchored in the bottom 64 to stabilize the entire device.

The tubular conduit 2 of FIG. 1 and the conduit 36 of FIG. 2 may be of any suitable length but it is contemplated that a tubular conduit extending upwardly in the neighborhood of 100 feet or more will be capable of providing a pressure difference across the blades of the turbines sufficient to drive the same and produce a substantial amount of electricity.

It is also contemplated that the tubular conduit 36 of FIG. 2 be surrounded by a jacket, spaced therefrom, to provide an annular insulating chamber to provide heat insulation for the column of warmer water. The annular chamber may contain only air although the bottom portion may contain water or other liquid serving as ballast and eliminating the need for the blister device 38.

The gas bubble, or aerated water lift, is really only an economizer. The hot gas jet will dissipate its combustion energy lifting the water column and as the gases cool, comingling with the water, they will shrink to only approximately one-fourth of their heated volume; as in combustion engines. With a 40 or 50 P.S.I. at the bottom of the column reduced to atmosphere at the top, the bubbles will tend to expand as they move upward after reaching water temperature. There are several ways of mixing and reducing the size of the bubbles, the screen being the simplest, but a multiplicity of them might be found necessary.

While specific forms of the invention have been shown and described herein, the same are merely illustrative of the principles involved and other forms may by resorted to within the scope of the appended claims.

What is claimed is:

1. An electrical generating system comprising:
   (a) a tubular chamber for confining an upstanding column of liquid;
   (b) a combustion chamber disposed within the tubular chamber for combusting fuel;
   (c) means for directing products of combustion from the combustion chamber into the upstanding column of liquid for heating the liquid and dispersing bubbles of the products of combustion therein to reduce the density of the liquid and cause same to rise in the tubular chamber;
   (d) the upper end of the tubular chamber being exposed to the atmosphere for permitting:
      i. the bubbles of the products of combustion to separate from the liquid and dissipate into the atmosphere, and
      ii. The separated liquid to fall over the upper edge of the tubular chamber and downwardly along the exterior surface thereof for recirculation through the lower end of the tubular chamber; and
   (e) a turbine disposed within and driven by the stream of recirculating liquid.

2. The system of claim 1 further including means disposed within the tubular chamber for breaking up and dispersing the bubbles of the products of combustion.

3. The system of claim 1 wherein the liquid is water.

4. The system of claim 1 further including an outer casing surrounding the tubular chamber and spaced therefrom to define an annular space through which the liquid is recirculated to the lower end of the tubular chamber.

5. The system of claim 1 wherein the turbine is disposed below the combustion chamber.

6. The system of claim 1 further including means disposed within the tubular chamber for imparting kinetic energy to the rising stream of liquid.

7. The system of claim 1 further including an electrical generator driven by the turbine.

8. The system of claim 7 wherein the generator is disposed in the atmosphere externally of the tubular chamber.

9. the system of claim 1 wherein the liquid is water and wherein the tubular chamber is confined in a larger body of water.

10. An electrical generating system comprising:
    (a) a combustion chamber for a fuel;
    (b) first means for directing the products of combustion from said chamber into an upstanding column of liquid to thereby heat the liquid and disperse bubbles of the products of combustion therein and thus reduce the density of the liquid and cause the same to rise in said column, said column extending upwardly to an upper end exposed to the atmosphere;
    (c) second means for directing cool liquid free of bubbles, to the lower end of said column to thereby establish a flowing stream of liquid in said column;
    (d) a liquid-driven turbine in said stream; and
    (e) means for removing acids from said liquid.

* * * * *